US009652746B2

(12) United States Patent
Stowe

(10) Patent No.: US 9,652,746 B2
(45) Date of Patent: May 16, 2017

(54) SYSTEMS AND METHODS FOR DELIVERING AN ENTITY REPORT ASSOCIATED WITH AN ATTENDEE OF A CALENDARED EVENT

(75) Inventor: Todd Stowe, Miamisburg, OH (US)

(73) Assignee: LexisNexis, a division of Reed Elsevier Inc., Miamisburg, OH (US)

( * ) Notice: Subject to any disclaimer, the term of this patent is extended or adjusted under 35 U.S.C. 154(b) by 929 days.

(21) Appl. No.: 13/537,640

(22) Filed: Jun. 29, 2012

(65) Prior Publication Data
US 2014/0006521 A1 Jan. 2, 2014

(51) Int. Cl.
*G06F 15/16* (2006.01)
*G06Q 10/10* (2012.01)

(52) U.S. Cl.
CPC .................................. *G06Q 10/109* (2013.01)

(58) Field of Classification Search
CPC ..... G06Q 10/109; H04L 65/403; H04L 67/22; H04L 12/1818
USPC .................................................. 709/204, 206
See application file for complete search history.

(56) References Cited

U.S. PATENT DOCUMENTS

| 7,530,021 | B2 | 5/2009 | Cheng et al. |
| 7,734,696 | B2 | 6/2010 | Osterberg, Jr. et al. |
| 8,209,206 | B2 | 6/2012 | Ellis et al. |
| 2003/0069899 | A1* | 4/2003 | Brown et al. ................. 707/200 |
| 2004/0141605 | A1 | 7/2004 | Chen et al. |
| 2006/0155750 | A1 | 7/2006 | Fowler et al. |
| 2007/0112926 | A1 | 5/2007 | Brett et al. |
| 2008/0147469 | A1 | 6/2008 | Murillo et al. |
| 2009/0044132 | A1 | 2/2009 | Combel et al. |
| 2010/0191569 | A1* | 7/2010 | Ellis et al. ........................ 705/9 |

OTHER PUBLICATIONS

International Search Report and Written Opinion, Application No. PCT/US13/47603 filed Jun. 25, 2013.

* cited by examiner

*Primary Examiner* — Hee Soo Kim
(74) *Attorney, Agent, or Firm* — Dinsmore & Shohl LLP

(57) ABSTRACT

Systems and methods for delivering an entity report associated with an attendee of a calendared event are disclosed. A method for delivering an entity report associated with an attendee of a calendared event includes determining, by a computer, an entity associated with the attendee of the calendared event. The method further includes retrieving, by the computer, entity data based on the determined entity and generating the entity report. The entity report includes the retrieved entity data. The method further includes delivering the generated report.

17 Claims, 7 Drawing Sheets

610

◯ ABC COMPANY

At a Glance | Industry Classification | Business Description | Auditor | Legal Counsel | Stock Information | Board of Directors | Stock Quotes and Charts | Yearly Financials | Five Year Summary | Key Competitors | Current News Executives | Company Hierarchy | Brands | Competitors Mergers & Acquisitions

600

| ABC COMPANY | |
|---|---|
| Type | Public |
| Address | 123 Main St. |
| | Smalltown, OH 12345 |
| | UNITED STATES |
| Phone | +1 513 555-1234 |
| Fax | +1 513 555-2345 |
| DUNS® Number | 12-234-5678 |
| Ticker(s) | ABCCO |
| Exch | NAS |
| Email | company@abccompany.com |
| Internet | www.abccompany.com |
| Employees | 10,000 |

| Business Description |
|---|
| ABC Comapny was founded in... |

| Auditor |
|---|
| XYZ Auditor |

| Legal Counsel |
|---|
| CDE Law Firm |
| Bigcity, OH |

| Stock Information |
|---|
| MARKET CAPITALIZATION : X |
| OUTSTANDING SHARES : Y |

| Board of Directors |
|---|
| ... |

FIG. 6

SYSTEMS AND METHODS FOR DELIVERING AN ENTITY REPORT ASSOCIATED WITH AN ATTENDEE OF A CALENDARED EVENT

BACKGROUND

Field

The present specification generally relates to delivering reports and, more particularly, to systems and methods for delivering an entity report associated with an attendee of a calendared event.

Technical Background

Computer users routinely utilize computer applications to schedule calendared events, such as meetings. An electronically scheduled meeting typically includes a number of attendees. The attendees of a schedule meeting may be affiliated with different entities (e.g., corporations, organizations, etc.). It may be desirable for a participant in a scheduled meeting to receive, in advance of the meeting, a report containing information pertaining to the entity that a particular meeting participant is affiliated with.

The present disclosure is directed to systems and methods for delivering an entity report associated with an attendee of a calendared event.

SUMMARY

In one embodiment, a method for delivering an entity report associated with an attendee of a calendared event includes determining, by a computer, an entity associated with the attendee of the calendared event. The method further includes retrieving, by the computer, entity data based on the determined entity and generating the entity report. The entity report includes the retrieved entity data. The method further includes delivering the generated report.

In another embodiment, a method for delivering an entity report in response to a user request to receive the entity report in advance of a calendared event includes receiving, by a computer, a request to receive an entity point pertaining to an entity in advance of the calendared event. The method further includes retrieving, by the computer, entity data associated with the entity and generating the entity report. The entity report includes the retrieved entity data. The method further includes delivering the generated entity report to the user in advance of the calendared event.

In yet another embodiment, a system for delivering an entity report associated with an attendee of a calendared event includes a computing device that includes a non-transitory memory component that stores a set of executable instructions that causes the computing device to determine an entity associated with the attendee of the calendared event. The executable instructions further cause the computing device to retrieve entity data based on the determined entity and generate the entity report. The entity report includes the retrieved entity data. The executable instructions further cause the computing device to deliver the generated report.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative in nature and not intended to limit the subject matter defined by the claims. The following detailed description of the illustrative embodiments can be understood when read in conjunction with the following drawings, wherein like structure is indicated with like reference numerals and in which:

FIG. 6 depicts a schematic illustration of an entity report, according to one or more embodiments shown and described herein.

DETAILED DESCRIPTION

Referring generally to the figures, embodiments described herein are directed to systems and methods for delivering an entity report associated with an attendee of a calendared event. The embodiments described herein may automatically determine an entity (e.g., a company, a non-profit organization, an educational institution, a partnership, a government entity, etc.) associated with the attendee of a calendared event or may retrieve a request to receive an entity report associated with a particular entity before a calendared event. Once the entity for which an entity report is desired is known, embodiments described herein may retrieve entity data associated with the entity, generate an entity report containing the retrieved entity data, and deliver the generated entity report. The delivered entity report may permit an attendee of a calendared event to quickly ascertain current relevant information pertaining to the entities that are associated with the calendared event. Various embodiments of systems and methods for generating a two-dimensional graphical grid representation of the treatment of a document are described below.

Figure 1:
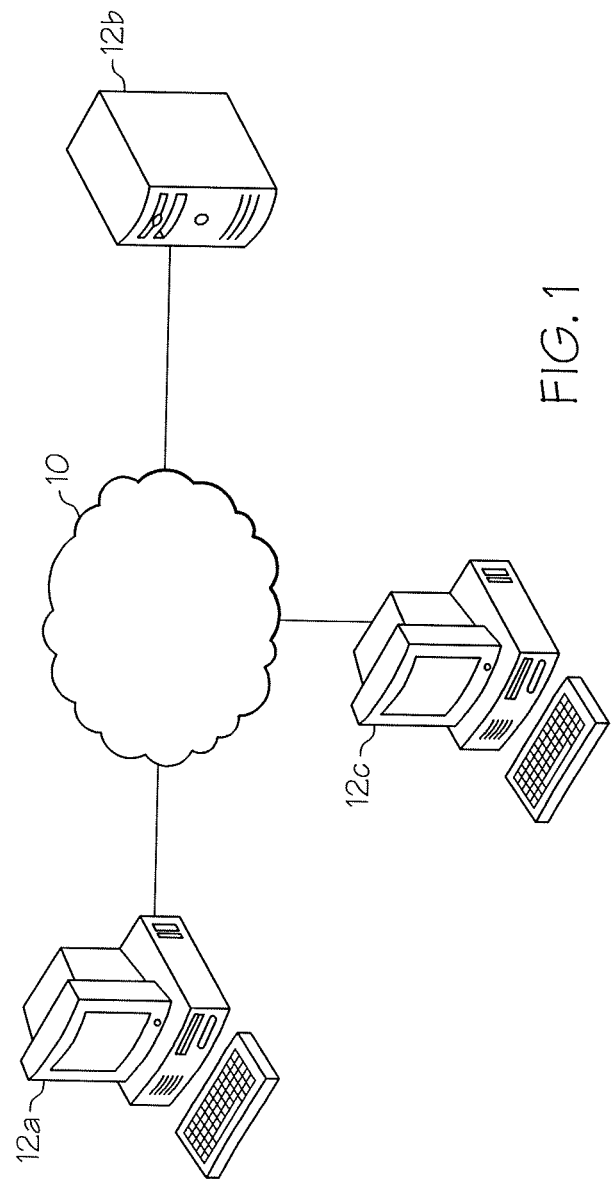
FIG. 1 depicts a schematic illustration of a computing network for a system for delivering an entity report associated with an attendee of a calendared event, according to one or more embodiments shown and described herein.

Referring now to the drawings, FIG. 1 depicts an exemplary computing network, illustrating components for a system for delivering an entity report associated with an attendee of a calendared event, according to embodiments shown and described herein. As illustrated in FIG. 1, a computer network 10 may include a wide area network, such as the internet, a local area network (LAN), a mobile communications network, a public service telephone network (PSTN) and/or other network and may be configured to electronically connect a user computing device 12a, a server computing device 12b, and an administrator computing device 12c.

The user computing device 12a may be used by a user to generate a meeting invitation and to receive an entity report generated and delivered by the server computing device 12b. The user computing device 12a may also be utilized to perform other user functions, such as to provide a graphical user interface for interacting with the computing network and to display, or otherwise communicate, information to the user. Additionally, included in FIG. 1 is the administrator computing device 12c. In the event that the server computing device 12b requires oversight, updating, or correction, the administrator computing device 12c may be configured to provide the desired oversight, updating, and/or correction. The administrator computing device 12c, as well as any other computing device coupled to the computer network 10, may be used to transmit information to the user computing device 12a and/or the server computing device 12b.

It should be understood that while the user computing device 12a and the administrator computing device 12c are depicted as personal computers and the server computing device 12b is depicted as a server, these are nonlimiting examples. More specifically, in some embodiments any type of computing device (e.g., mobile computing device, personal computer, server, etc.) may be utilized for any of these components. Additionally, while each of these computing devices is illustrated in FIG. 1 as a single piece of hardware, this is also merely an example. More specifically, each of the user computing device 12a, server computing device 12b, and administrator computing device 12c may represent a plurality of computers, servers, databases, etc.

Figure 2:
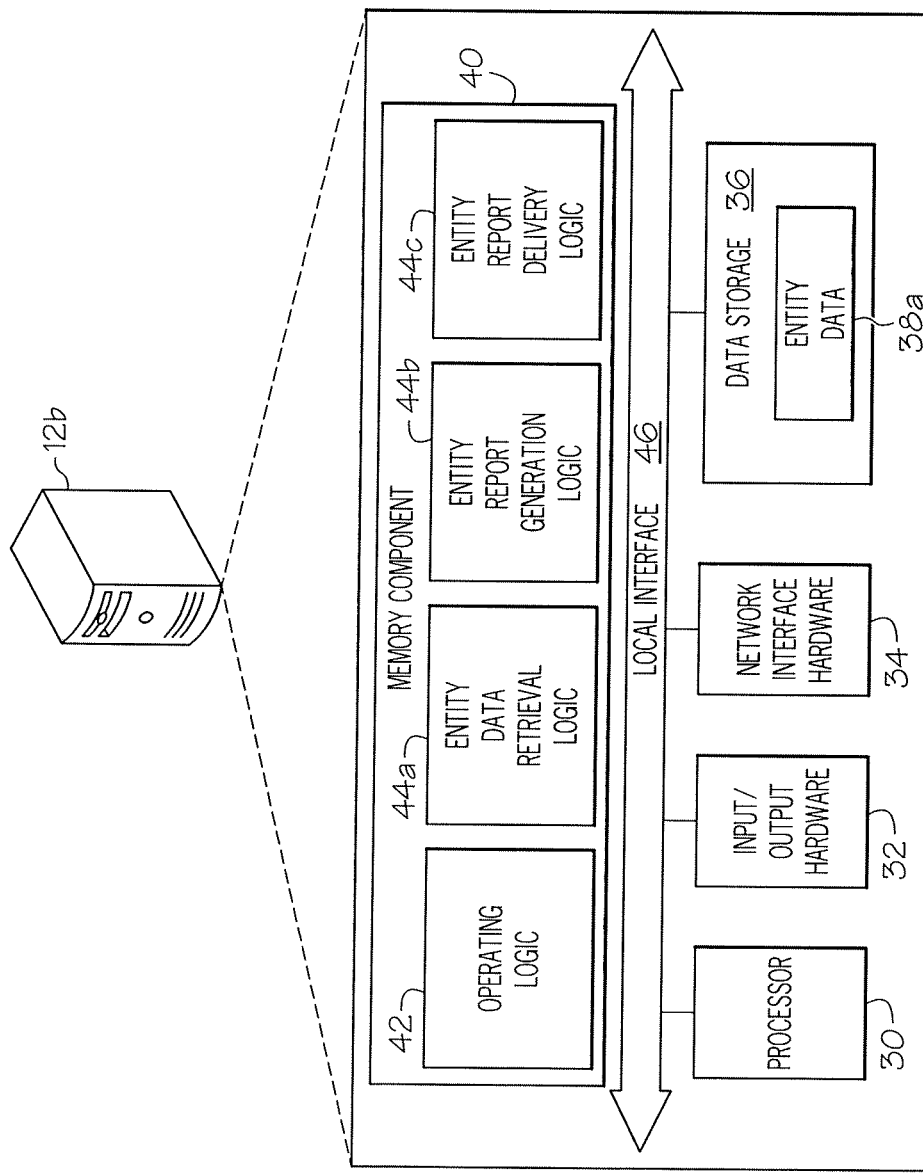
FIG. 2 depicts a schematic illustration of the server computing device from FIG. 1, further illustrating hardware and software that may be utilized in delivering the entity report, according to one or more embodiments shown and described herein.

FIG. 2 depicts the server computing device 12b, from FIG. 1, further illustrating a system for delivering an entity report associated with an attendee of a calendared event, and/or a non-transitory computer-readable medium for delivering an entity report associated with an attendee of a calendared event embodied as hardware, software, and/or firmware, according to embodiments shown and described herein. While in some embodiments, the server computing device 12b may be configured as a general purpose computer with the requisite hardware, software, and/or firmware, in some embodiments, that server computing device 12b may be configured as a special purpose computer designed specifically for performing the functionality described herein.

As also illustrated in FIG. 2, the server computing device 12b may include a processor 30, input/output hardware 32, network interface hardware 34, a data storage component 36 (which may store entity data 38a), and a non-transitory memory component 40. The memory component 40 may be configured as volatile and/or nonvolatile computer readable medium and, as such, may include random access memory (including SRAM, DRAM, and/or other types of random access memory), flash memory, registers, compact discs (CD), digital versatile discs (DVD), and/or other types of storage components. Additionally, the memory component 40 may be configured to store operating logic 42, entity data retrieval logic 44a, entity report generation logic 44b, and entity report delivery logic 44c (each of which may be embodied as a computer program, firmware, or hardware, as an example). A local interface 46 is also included in FIG. 2 and may be implemented as a bus or other interface to facilitate communication among the components of the server computing device 12b.

The processor 30 may include any processing component configured to receive and execute instructions (such as from the data storage component 36 and/or memory component 40). The input/output hardware 32 may include a monitor, keyboard, mouse, printer, camera, microphone, speaker, touch-screen, and/or other device for receiving, sending, and/or presenting data. The network interface hardware 34 may include any wired or wireless networking hardware, such as a modem, LAN port, wireless fidelity (Wi-Fi) card, WiMax card, mobile communications hardware, and/or other hardware for communicating with other networks and/or devices.

It should be understood that the data storage component 36 may reside local to and/or remote from the server computing device 12b and may be configured to store one or more pieces of data for access by the server computing device 12b and/or other components. As illustrated in FIG. 2, the data storage component 36 may store entity data 38a. The entity data 38a may be stored in one or more data storage devices.

Entity data 38a may include information related to one or more entities, such as companies, non-profit organizations, educational institutions, partnerships, government entities, etc. Entity data 38a may be any type of data or information related to or pertaining to one or more entities. In one embodiment, entity data 38a may be information related to a plurality of companies. In such an embodiment, the entity data 38a may include snapshot information pertaining to each company (e.g., the type of company (whether public or private), the address of the company, the phone number of the company, the fax number of the company, the data universal numbering system ("DUNS") number associated with the company, the ticker symbol for the company, the stock exchange (if any) that the company is traded on, the general e-mail address of the company, the number of employees of the company, etc.). In an embodiment in which entity data 38a includes data pertaining to a plurality of companies, the entity data 38a may also include, for each company, the industry classification of the company, the business description of the company, the auditor of the company, any legal counsel utilized by the company, stock information related to the company (e.g., market capitalization, classes of shares, number of outstanding shares in each class, etc.), the board of directors of the company, stock quotes or charts associated with the company, financial statements of the company, competitors of the company, current news related to the company, the company hierarchy or organizational chart, brands associated with the company, any mergers and/or acquisitions that the company has been part of. The foregoing list of types of information is by no means exhaustive. In other embodiments, in which entity data 38a includes information related to a plurality of companies, entity data 38a may include information other than the types enumerated above. In still other embodiments, entity data 38a may include information related to an entity other than a company, e.g., a non-profit organization, an educational institution, a partnership, a government entity, etc. Thus, entity data 38a contains any type of information associated with any type of entity.

Included in the memory component 40 are the operating logic 42, the entity data retrieval logic 44a, the entity report generation logic 44b, and the entity report delivery logic 44c. The operating logic 42 may include an operating system and/or other software for managing components of the server computing device 12b. Similarly, the entity data retrieval logic 44a may reside in the memory component 40 and may be configured to retrieve entity data 38a from data storage component 36. The entity report generation logic 44b may reside in the memory component 40 and may be configured to generate the entity report that includes entity data 38*a*. The entity report delivery logic 44*c* may reside in the memory component 40 and may be configured to deliver the generated entity report.

It should be understood that the components illustrated in FIG. 2 are merely exemplary and are not intended to limit the scope of this disclosure. More specifically, while the components in FIG. 2 are illustrated as residing within the server computing device 12*b*, this is a nonlimiting example. In some embodiments, one or more of the components may reside external to the server computing device 12*b*. For example, while FIG. 2 is directed to the server computing device 12*b*, other components such as the user computing device 12*a* and the administrator computing device 12*c* may include similar hardware, software, and/or firmware.

Figure 3:
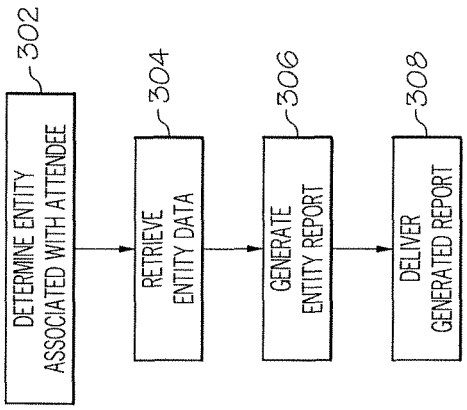
FIG. 3 depicts a flowchart graphically illustrating a method of delivering an entity report associated with an attendee of a calendared event, according to one or more embodiments shown and described herein.

Referring now to FIG. 3 (and FIGS. 1 and 2), a flowchart that graphically illustrates a method of delivering an entity report associated with an attendee of a calendared event according to one or more embodiments is provided. At block 302, an entity associated with an attendee of a calendared event is determined. The entity associated with the attendee of the calendared event may be determined by the server computing device 12*b* or by the user computing device 12*a*. In one embodiment, a user of the user computing device 12*a* may schedule a calendared event using an e-mail application, a scheduling application, or a calendaring application. In one embodiment, the calendared event may be scheduled using Microsoft Outlook or Lotus Notes. In another embodiment, the calendared event may be scheduled using a calendaring application on a smartphone or tablet computing device, for example. In yet another embodiment, a CRM calendaring application may be utilized to schedule the calendared event. However, it should be understood that the calendared event including the attendee may be established in other ways.

Figure 5:
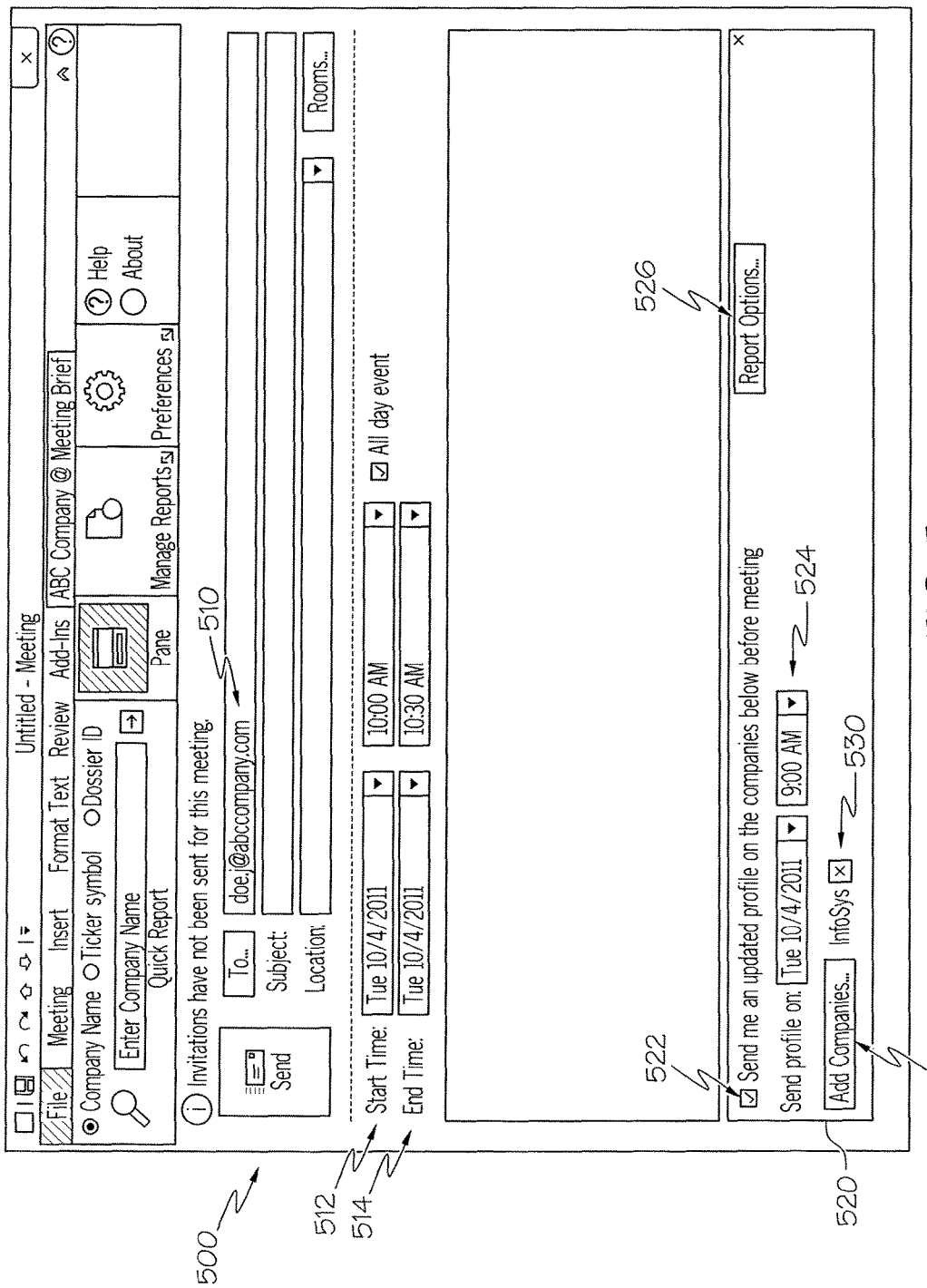
FIG. 5 depicts a schematic illustration of a meeting invitation dialog box, according to one or more embodiments shown and described herein.

Referring to FIG. 5, which depicts a meeting invitation dialog box that may be displayed on the user computing device 12*a* in one embodiment, a user may send an invitation to a calendared event (e.g., a meeting). The user may invite a number of attendees to the meeting scheduled to begin at start time 512 and end at end time 514 by entering the attendees in the "To . . . " field 510. The attendees may be entered by inputting the e-mail address associated with each attendee. In other embodiments, the attendees may be entered in other ways. The entity associated with an attendee of the calendared event may be determined from the list of attendees entered in field 510. For example, as depicted in FIG. 5, "doe.j@abccompany.com" has been entered to invite John Doe of ABC Company as an attendee of the calendared event that is being scheduled by the user utilizing dialog box 500. The entity associated with this attendee may be determined by user computing device 12*a* or by the server computing device 12*b*. In the context of an e-mail address, the e-mail address typically includes a local portion ("doe.j" in the example depicted in FIG. 5), and a domain name ("abccompany.com" in the example depicted in FIG. 5). The entity associated with an attendee may be determined based on the domain name of the attendee's e-mail address, which may be extracted from the e-mail address. In one embodiment, the entity may be determined from the domain name by performing a domain name lookup utilizing a domain name lookup service, for example. In another embodiment, the entity may be determined from the domain name utilizing a domain name lookup database that includes a mapping of domain names to entities. In the example depicted in FIG. 5, the entity associated with the John Doe attendee may be determined by mapping the abccompany.com domain name to the entity ABC Company.

In some embodiments, the entity that a domain name is mapped to may include two or more locations, divisions or other organizational units. For example, the domain name "abccompany.com" may be mapped to the entity ABC Company, which may have multiple locations (e.g., a U.S. headquarters location and an International headquarters location). Different entity data may be associated with each location, division, or other organizational unit.

Still referring to FIG. 5, in another embodiment, the entity associated with the John Doe attendee may be determined by transmitting a message from the user computing device 12*a* to the server computing device 12*b*. The message may be transmitted in response to a user of user computing device 12*a* entering attendee information into field 510 of dialog box 500. The message may be transmitted after the attendee is entered, but before the user sends the meeting invitation in one embodiment. In another embodiment, the message may be transmitted to the server computing device 12*b* after the user has sent the meeting invitation. In other embodiments, the message may be sent at another time. The server computing device 12*b* may receive the message containing the e-mail address associated with the attendee. The e-mail address may include an entity portion, which in the example of FIG. 5 could be the domain name "abccompany.com". The server computing device 12*b* may determine the entity associated with the e-mail address of the received message based on the domain name of the e-mail address. In other embodiments, the server computing device 12*b* may receive a message that contains an attendee of a calendared event and other information from which an entity associated with the attendee may be determined. In some embodiments, the entity may be determined locally rather than remotely.

Once an entity is determined, it may be displayed in the list of selected entities 530. If the meeting invitation involves multiple invitees that are affiliated with more than one entity, more than one entity may be determined and displayed in the list of selected entities 530.

In another embodiment, the determination of an entity associated with an attendee of a calendared event may be triggered by other events. For example, when an attendee of a calendared event receives an invitation to the calendared event at user computing device 12*a*, the user computing device 12*a* and/or the server computing device 12*b* may determine an entity associated with the attendee of the calendared event to which the user received an invitation.

Referring again to FIG. 3 (and FIGS. 1 and 2), at block 304, entity data is retrieved based on the entity determined at block 302. In one embodiment, entity data retrieval logic 44*a* causes server computing device 12*b* to retrieve entity data 38*a* from data storage component 36. In other embodiments, entity data may be retrieved from one or more data sources external to server computing device 12*b* or the user computing device 12*a*.

At block 306, an entity report including the entity data retrieved at block 304 is generated. In one embodiment, the entity report generation logic 44*b* causes server computing device 12*b* to generate the entity report including the retrieved entity data. Referring now to FIG. 6, one embodiment of an entity report 600 is schematically depicted. The entity report may include a number of sections, each of which may contain information pertaining to the section. For example, the entity report 600 depicted in FIG. 6 displays a summary section including quick facts pertaining to ABC Company (e.g., the type of company, the address, the phone number, etc.). The entity report 600 also displays a "Business Description" section, an "Auditor" section, a "Legal Counsel" section, a "Stock information" section, and a "Board of Directors" section. Optionally, the entity report 600 may include a hyperlink section 610 that contains hyperlinks that may take a user directly to the hyperlinked section. The entity report 600 depicted in FIG. 6 is merely one example. It should be understood that in other embodiments the generated entity report may be in a different format and may contain more or less information than what is depicted in FIG. 6.

Referring again to FIG. 3 (and FIGS. 1 and 2), at block 308, the entity report generated at block 306 is delivered. In some embodiments, the entity report may be delivered to a user of user computing device 12*a*. In other embodiments, the entity report may be delivered to a user of a different computing device. In one embodiment, the entity report may be delivered via e-mail. For example, the entity report may be delivered via e-mail to an attendee of a calendared event in advance of the calendared so that the recipient of the entity report may review information pertaining to the entities associated with the other attendees of the calendared event. In another embodiment, the entity report may be delivered via a website accessible to a user that wishes to access the generated entity report. In some embodiments, the entity report may be delivered before the calendared event is to take place. In other embodiments, the entity report may be delivered concurrently with the calendared event or after the calendared event takes place.

Figure 4:
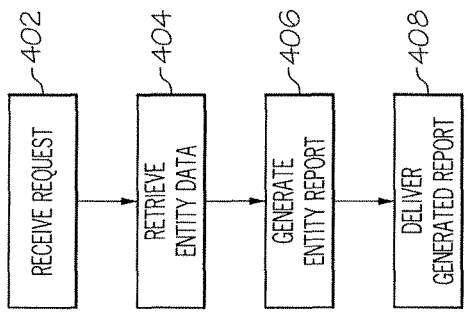
FIG. 4 depicts a flowchart graphically illustrating a method of delivering an entity report in response to a user request to receive the entity report in advance of a calendared event, according to one or more embodiments shown and described herein.
Figure 7:
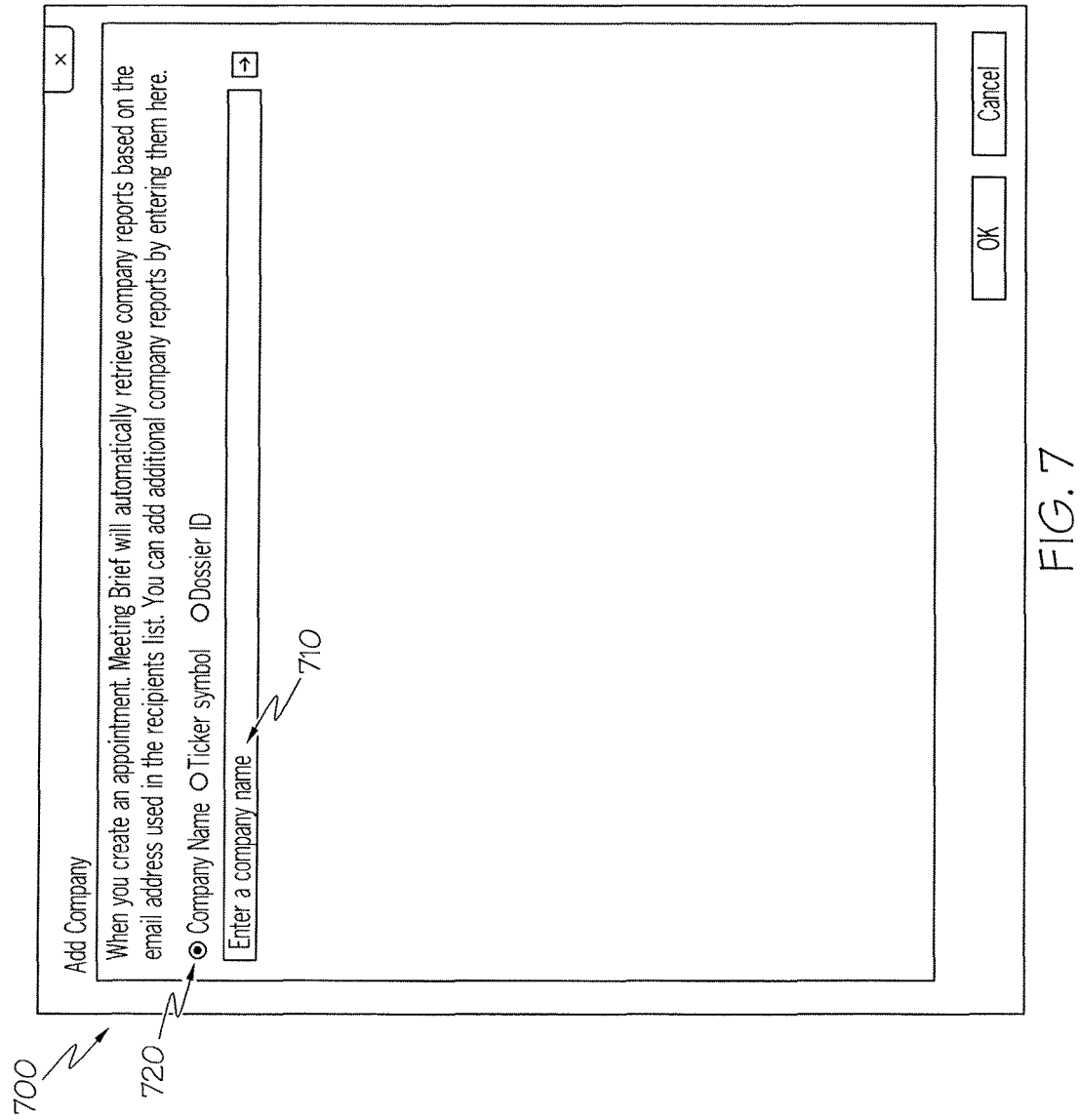
FIG. 7 depicts a schematic illustration of a dialog box that permits the user of the system to request entity reports, according to one or more embodiments shown and described herein.

Referring now to FIG. 4 (and FIGS. 1 and 2), a flowchart that graphically illustrates a method of delivering an entity report in response to a user request to receive the entity report in advance of a calendared event according to one or more embodiments is provided. At block 402, a request request to receive an entity point pertaining to an entity in advance of the calendared event is received. Referring to FIG. 5, the user utilizing dialog box 500 to schedule the calendared event may be provided with an entity report customization portion 520 of the dialog box 500. The entity report customization portion 520 may include a checkbox 522 that allows the user to request that an entity report be sent in advance of the meeting and a button 528 that enables the user to add companies to the list of entities for which the user will receive an entity report. Upon clicking the button 528, the user may be presented an add company dialog box 700, as shown in FIG. 7, that allows the user to enter, in field 710, additional companies for which to request entity reports. As depicted in FIG. 7, the user may be presented with a number of options 720 for entering the company (e.g., by entering the company name, the ticker symbol of the company, or the Dossier ID of the company). In other embodiments, the add company dialog box 700 may include more or less features and may be presented differently than what is depicted in FIG. 7. In other embodiments, the user may be able to directly enter the companies utilizing the dialog box 500. In still other embodiments, a user may request to receive an entity report in advance of a calendared event in other ways (e.g, by accessing a website).

Figure 8:
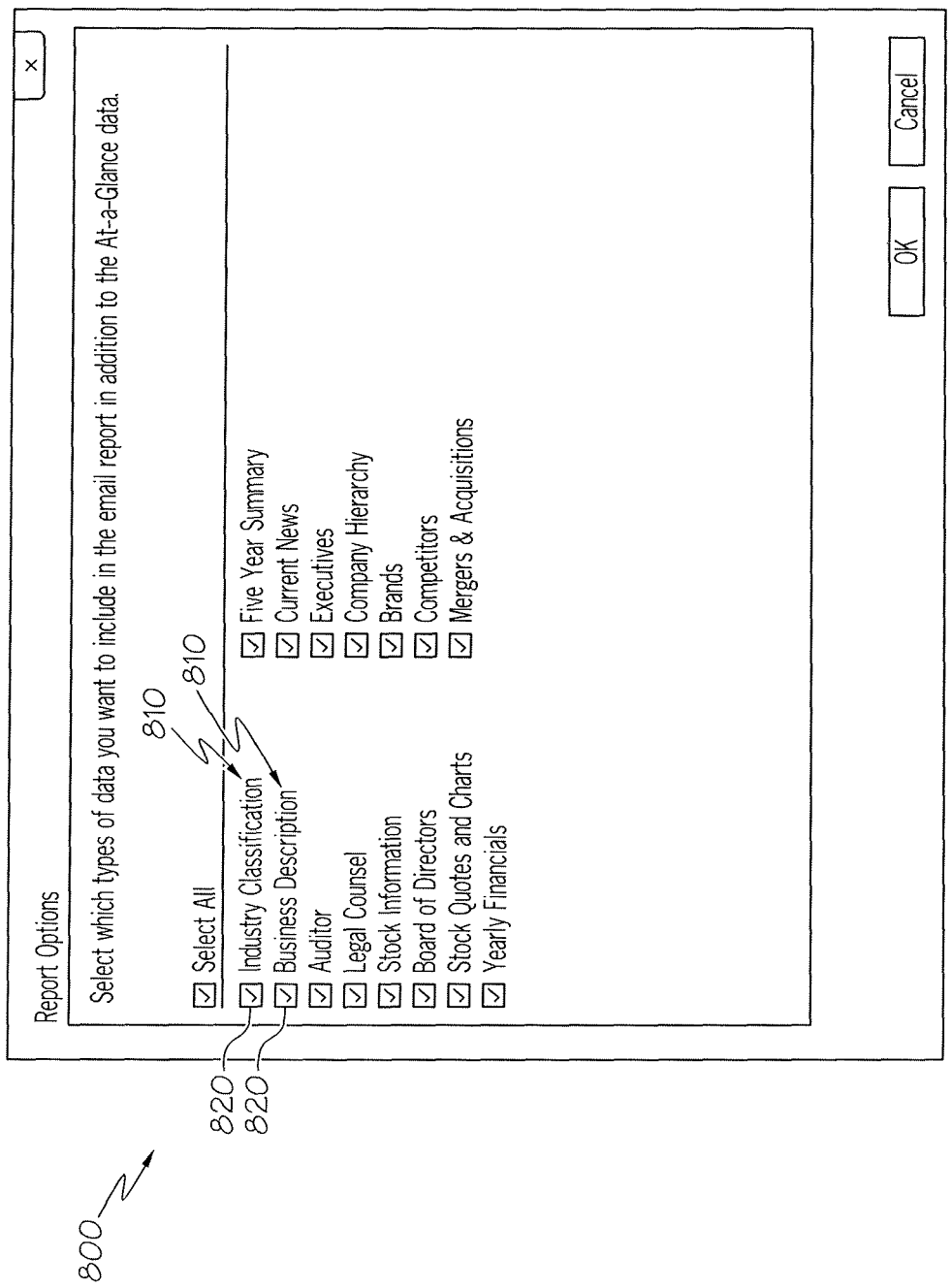
FIG. 8 depicts a schematic illustration of a report options dialog box, according to one or more embodiments shown and described herein.

Referring once again to FIG. 5, the entity report customization portion 520 may also allow a user to select a time at which the entity reports will be delivered in the time selection field 524. The entity report customization portion 520 may also include a report options button 526. By clicking the report options button 526, a report options dialog box 800, as depicted in FIG. 8, may be displayed to the user. The report options dialog box 800 may allow a user to customize the information contained in the delivered entity report, by providing a plurality of checkboxes 820 that the user may check or uncheck depending on whether they would like the entity report to contain the categories of information 810.

Referring once again to FIG. 5, the entity report customization portion 520 may also include a list of selected entities 530, which may depict the entities for which the user will receive entity reports. The user may remove entities by clicking the "x" next to the displayed entity, for example. In other embodiments, the entity report customization portion 520 may include additional features or omit some of the features depicted in FIG. 5. It should be understood that other embodiments may not include an entity report customization portion 520.

Referring once again to FIG. 4 (and FIGS. 1 and 2), at block 404, entity data associated with the entity is retrieved. In one embodiment, entity data retrieval logic 44*a* causes server computing device 12*b* to retrieve entity data 38*a* from data storage component 36. In other embodiments, entity data may be retrieved from one or more data sources external to server computing device 12*b*.

At block 406, an entity report including the entity data retrieved at block 404 is generated. In one embodiment, the entity report generation logic 44*b* causes server computing device 12*b* to generate the entity report including the retrieved entity data. Referring now to FIG. 6, one embodiment of an entity report 600 is schematically depicted. The entity report may include a number of sections, each of which may contain information pertaining to the section. For example, the entity report 600 depicted in FIG. 6 displays a summary section including quick facts pertaining to ABC Company (e.g., the type of company, the address, the phone number, etc.). The entity report 600 also displays a "Business Description" section, an "Auditor" section, a "Legal Counsel" section, a "Stock information" section, and a "Board of Directors" section. Optionally, the entity report 600 may include a hyperlink section 610 that contains hyperlinks that may take a user directly to the hyperlinked section. The entity report 600 depicted in FIG. 6 is merely one example. It should be understood that in other embodiments the generated entity report may be in a different format and may contain more or less information than what is depicted in FIG. 6.

Referring once again to FIG. 4 (and FIGS. 1 and 2), at block 408, the entity report generated at block 406 is delivered to the user in advance of the calendared event. In one embodiment, the entity report may be delivered via e-mail. For example, the entity report may be delivered via e-mail to an attendee of a calendared event in advance of the calendared so that the recipient of the entity report may review information pertaining to the entities associated with the other attendees of the calendared event. In another embodiment, the entity report may be delivered via a website accessible to a user that wishes to access the generated entity report.

While the flowcharts of FIGS. 3 and 4 describe retrieving entity data and generating an entity report including the retrieved entity data, in other embodiments, the entity data may have been previously retrieved and included in an entity report that has already been generated. In such an embodiment, the generated entity report could be directly delivered once the entity is determined.

Although blocks 302-308 of FIG. 3 and blocks 402-408 of FIG. 4 have been described as being separate tasks, in other embodiments, the blocks may be combined or omitted. Further, while the tasks of blocks 302-308 of FIG. 3 and blocks 402-408 of FIG. 4 have been described as being performed in a particular order, in other embodiments, the tasks may be performed in a different order.

It should be understood that embodiments described herein provide for systems and methods for delivering an entity report associated with an attendee of a calendared event. The embodiments described herein may automatically determine an entity associated with the attendee of a calendared event or may retrieve a request to receive an entity report associated with a particular entity before a calendared event. Once the entity for which an entity report is desired is known, embodiments described herein may retrieve entity data associated with the entity, generate an entity report containing the retrieved entity data, and deliver the generated entity report. The delivered entity report may permit an attendee of a calendared event to quickly ascertain current relevant information pertaining to the entities that are associated with the calendared event.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for delivering an entity report associated with an attendee of a calendared event, the method comprising:
   determining, by a computer, an entity associated with the attendee of the calendared event;
   retrieving, by the computer, entity data based on the determined entity;
   generating the entity report, wherein the entity report includes the retrieved entity data; and
   delivering the generated report.

2. The method of claim 1 wherein the entity data is retrieved from an entity data database.

3. The method of claim 1 further comprising receiving a message including an entity portion associated with the attendee of the calendared event, wherein the entity associated with the attendee of the calendared event is determined based on the entity portion of the received message.

4. The method of claim 3 wherein the message includes an e-mail address and the entity portion is a domain name of the e-mail address, and the entity associated with the attendee of the calendared event is determined based a domain-name lookup of the domain name.

5. The method of claim 1 wherein the entity associated with the attendee of the calendared event is determined based on an e-mail address associated with the attendee of the calendared event.

6. The method of claim 5 wherein the entity associated with the attendee of the calendared event is determined based on a domain name of the e-mail address.

7. The method of claim 6 further comprising extracting the domain name from the e-mail address.

8. The method of claim 5 wherein the entity associated with the attendee of the calendared event is determined by retrieving the entity from a domain name mapping database that maps the domain name to the entity.

9. The method of claim 1 wherein the generated report is delivered via e-mail.

10. The method of claim 1 wherein the generated report is delivered prior to the calendared event.

11. The method of claim 1 wherein the calendared event is scheduled through an e-mail, scheduling, or calendaring application.

12. The method of claim 11 wherein the calendared event is scheduled through Microsoft Outlook or Lotus Notes.

13. The method of claim 1 wherein the entity is determined in response to a user scheduling the calendared event.

14. The method of claim 1 wherein the entity is determined in response to a user receiving an invitation to the calendared event.

15. A system for delivering an entity report associated with an attendee of a calendared event, the system comprising:
   a computing device that comprises a non-transitory memory component that stores a set of executable instructions that causes the computing device to:
      determine an entity associated with the attendee of the calendared event;
      retrieving entity data based on the determined entity;
      generate the entity report, wherein the entity report includes the retrieved entity data; and
      deliver the generated report.

16. The system of claim 15 wherein the entity associated with the attendee of the calendared event is determined based on an e-mail address associated with the attendee of the calendared event.

17. The system of claim 16 wherein the entity report is delivered via e-mail prior to the calendared event.

* * * * *